US009927862B2

(12) United States Patent
Shearer et al.

(10) Patent No.: US 9,927,862 B2
(45) Date of Patent: Mar. 27, 2018

(54) VARIABLE PRECISION IN HARDWARE PIPELINES FOR POWER CONSERVATION

(71) Applicant: Microsoft Technology Licensing, LLC, Redmond, WA (US)

(72) Inventors: Robert Shearer, Woodinville, WA (US); Matthew Tubbs, Redmond, WA (US); Ryan Haraden, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 38 days.

(21) Appl. No.: 14/718,512

(22) Filed: May 21, 2015

(65) Prior Publication Data

US 2016/0342192 A1 Nov. 24, 2016

(51) Int. Cl.
*G06F 1/26* (2006.01)
*G06F 1/32* (2006.01)
*G06T 1/20* (2006.01)

(52) U.S. Cl.
CPC .............. *G06F 1/3237* (2013.01); *G06T 1/20* (2013.01); *G06F 1/26* (2013.01)

(58) Field of Classification Search
CPC ..................................... G06F 1/32; G06F 1/26
See application file for complete search history.

(56) References Cited

U.S. PATENT DOCUMENTS

| 5,761,103 | A | 6/1998 | Oakland et al. |
| 5,996,083 | A | 11/1999 | Gupta et al. |
| 6,147,915 | A | 11/2000 | Yanagisawa et al. |
| 6,745,336 | B1 | 6/2004 | Martonosi et al. |
| 6,775,403 | B1 * | 8/2004 | Ban ................ G06K 9/00201 |
|  |  |  | 382/118 |
| 6,919,897 | B1 | 7/2005 | Ford et al. |
| 6,947,056 | B2 | 9/2005 | Kwong |

(Continued)

FOREIGN PATENT DOCUMENTS

| WO | 2009144539 A2 | 12/2009 |
| WO | 2014098845 A1 | 6/2014 |

OTHER PUBLICATIONS

"International Search Report and Written Opinion Issued in PCT Application No. PCT/US2016/028195", Mailed Date: Jul. 8, 2016, 13 Pages.

(Continued)

*Primary Examiner* — Phil Nguyen
(74) *Attorney, Agent, or Firm* — Jacob P. Rohwer; Newport IP, LLC

(57) ABSTRACT

A digital signal processor includes a variable precision hardware pipeline that provides a maximum level of precision using a first plurality of bits for a mathematical representation. The pipeline stages include data registers to store the first plurality of bits. A precision select module selects a level of precision for processing a block of instructions and sets a precision control register. Logic circuitry utilizes the precision control register to gate the clock signal for one or more of the first plurality of bits to reduce the precision of the hardware pipeline. The logic circuitry disables the clock signal for the data latches in the pipeline corresponding to bits to be disabled to reduce the precision. By disabling the clock signal for the data registers, the amount of power consumed by the pipeline can be reduced.

20 Claims, 6 Drawing Sheets

(56) References Cited

U.S. PATENT DOCUMENTS

| | | |
|---|---|---|
| 7,027,665 B1 | 4/2006 | Kagle et al. |
| 7,199,799 B2 | 4/2007 | Hutchins et al. |
| 7,317,827 B2 | 1/2008 | Munsil |
| 7,460,160 B2 | 12/2008 | Hershey et al. |
| 7,689,052 B2 | 3/2010 | Sullivan et al. |
| 7,974,996 B1 | 7/2011 | North et al. |
| 8,019,805 B1* | 9/2011 | Sarma ............... G06F 7/4876 708/503 |
| 8,255,726 B2 | 8/2012 | Barowski et al. |
| 8,593,483 B2 | 11/2013 | Cote et al. |
| 8,595,279 B2 | 11/2013 | Dockser |
| 8,736,628 B1 | 5/2014 | Hutchins et al. |
| 8,749,576 B2 | 6/2014 | Hutchins et al. |
| 8,854,503 B2 | 10/2014 | Blayvas |
| 2003/0043911 A1* | 3/2003 | Guevorkian ........ G06T 7/2026 375/240.12 |
| 2004/0165693 A1* | 8/2004 | Lee ............... H03K 19/00384 377/94 |
| 2005/0078535 A1 | 4/2005 | Choi et al. |
| 2005/0258893 A1* | 11/2005 | Garlapati ............ H03M 1/002 327/544 |
| 2008/0130987 A1 | 6/2008 | Stokes |
| 2009/0106336 A1* | 4/2009 | Muraki ............... G06F 7/5443 708/210 |
| 2011/0242115 A1 | 10/2011 | Tsao et al. |
| 2012/0151191 A1 | 6/2012 | Boswell et al. |
| 2012/0300092 A1 | 11/2012 | Kim et al. |
| 2013/0004071 A1 | 1/2013 | Chang et al. |
| 2013/0057713 A1 | 3/2013 | Khawand |
| 2013/0124594 A1 | 5/2013 | Krishnamoorthy et al. |
| 2014/0188968 A1 | 7/2014 | Kaul et al. |
| 2014/0347374 A1 | 11/2014 | Hoshino et al. |

OTHER PUBLICATIONS

Amendment under Article 34 PCT dated Aug. 10, 2016, International Appliction No. PCT/US2016/028195.

Hao, et al., "Variable-Precision Rendering", In Proceedings of the ACM symposium on Interactive 3D graphics, Mar. 19, 2001, 11 pages.

"Fixed-Point Arithmetic", Retrieved on: Feb. 26, 2015 Available at http://en.wikipedia.org/wiki/Fixed-point_arithmetic.

"Floating Point", Retrieved on: Feb. 26, 2015 Available at: http://en.wikipedia.org/wiki/Floating_point.

Maxfield, Clive, "Variable-precision fixed/floating-point formats for Verilog", Published on: Jul. 27, 2006 Available at: http://www.eetimes.com/document.asp?doc_id=1301041.

"Second Written Opinion Issued in PCT Application No. PCT/US2016/028195", dated May 15, 2017, 4 Pages.

Kikuchi, Yu, et al., "A 40 nm 222 mW H.264 Full-HD Decoding, 25 Power Domains, 14-Core Application Processor With x512b Stacked DRAM," IEEE Journal of Solid-State Circuits, vol. 46, No. 1, Jan. 2011, 10 pages.

"International Preliminary Report on Patentability Issued in PCT Application No. PCT/US2016/028195", dated Nov. 10, 2017, 7 Pages.

\* cited by examiner

VARIABLE PRECISION IN HARDWARE PIPELINES FOR POWER CONSERVATION

BACKGROUND

The present disclosure relates to digital signal processing in hardware compute pipelines.

Digital signal processing in modern electronic devices can consume a large amount of power, particularly for today's high performance applications. Image signal processing in mobile electronic devices, for example, can consume a large amount of the limited power available to these devices. As the performance expectation of mobile computing devices increases, so can the power consumed.

Power consumption in digital signal processing for many devices is a function of the number of bits processed by a hardware compute pipeline. For example, fixed or floating point hardware pipelines for image signal processing typically include a large number of bits to support a high level of precision for image data manipulation. The pipeline includes data registers and logic gates at each pipeline stage to support the selected precision. These data registers and logic gates consume power as they transition to process image data.

SUMMARY

A digital signal processing system is disclosed including a hardware pipeline having one or more compute stages that support a maximum precision. The hardware pipeline may include a clock signal and a set of data latches for storing a first plurality of bits in a first pipeline stage. The system includes control circuitry configured to predict for data frames and/or segments of data frames a level of precision of the one or more compute stages that is needed to process the frame or segment. The control circuitry disables a portion of the hardware compute stages for a selected data frame when the predicted level of precision is less than the maximum precision. In one embodiment, the system includes a control register that can select a precision of the hardware compute pipeline, and control logic that determines whether a full precision of the hardware pipeline can be reduced when processing each data frame. The control logic can set the precision control register to select a reduced precision of the hardware pipeline in response to a determination that the full precision of the hardware pipeline can be reduced for one or more of the data frames. The system includes one or more gates configured to disable the clock signal for one or more of the data latches of the hardware pipeline based on the control register when processing the one or more data frames.

In one example, a digital signal processing system predicts for one or more segments of a data frame that a full precision of a hardware pipeline can be reduced when processing the one or more segments. The system sets a precision configuration register based on predicting that the full precision of the hardware pipeline can be reduced for processing the one or more segments. In response to the precision configuration register, the system disables the clock signal for one or more of the data latches in the first pipeline stage during processing of the one or more segments of the data frame.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
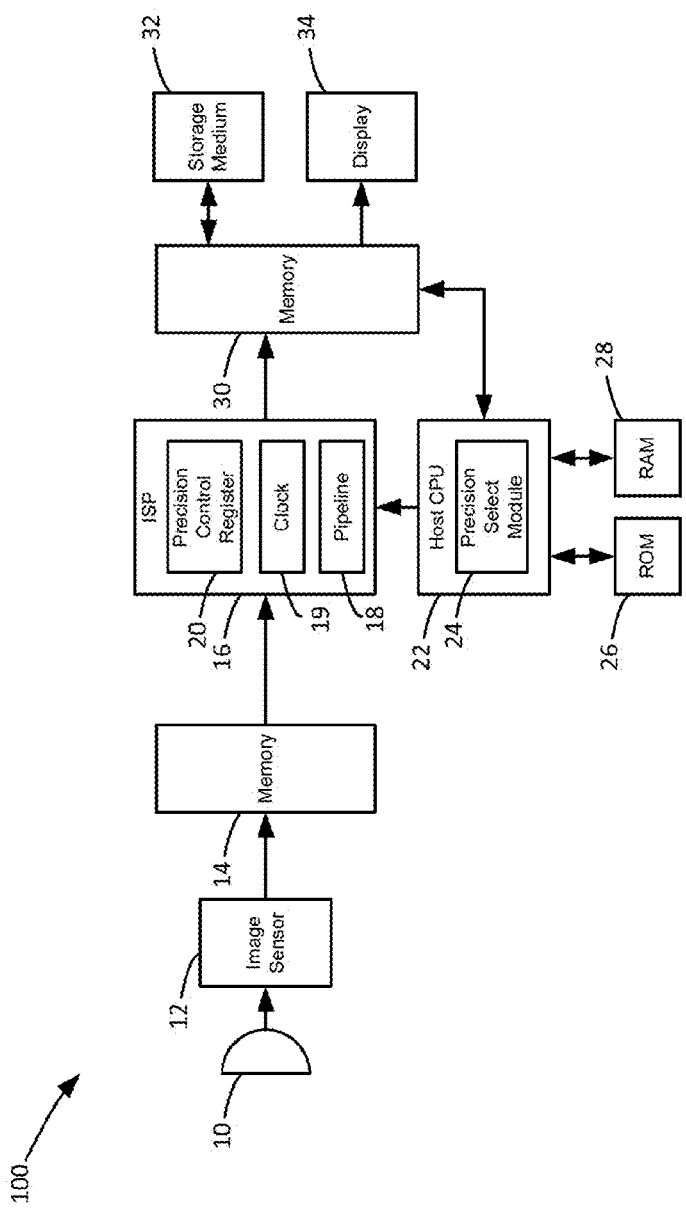
FIG. 1 depicts a digital imaging device including a hardware compute pipeline and a precision configuration register.

Technology is described for digital signal processing of data frames using a variable precision hardware compute pipeline. A digital imaging device includes a hardware compute pipeline that provides a maximum level of precision using a first plurality of bits for a mathematical representation. Each stage of the pipeline may include a data register including a set of data latches to store each of the first plurality of bits. A precision configuration register is coupled to the hardware pipeline and a clock source. Gate logic circuitry utilizes the precision configuration register to gate the clock signal for one or more of the first plurality of bits to reduce the precision of the hardware pipeline. The gate logic circuitry may disable the clock signal for the data latches in the pipeline corresponding to bits to be disabled to reduce the precision. By disabling the clock signal for the data registers, the amount of power consumed by the pipeline can be reduced. The precision can be reduced beginning with a least significant bit of the pipeline and proceed toward the most significant bit according to a number of bits to be disabled to achieve the selected precision.

In one embodiment, a digital imaging device includes one or more control circuits and a hardware compute pipeline. The one or more control circuits can include a host processor that is configured with a precision select module that selects a level of precision of the hardware compute pipeline for processing a block of instructions. The precision select module may control a precision configuration register to disable portions of the hardware compute pipeline and thereby reduce the power consumed. The precision select module may determine when particular levels of mathematical precision of the pipeline may be reduced. The precision select module may predict for particular data frames that the mathematical precision of the pipeline can be reduced. The precision select module may additionally or alternately predict for particular segments of an individual data frame that the mathematical precision of the pipeline can be reduced. After selecting a level of precision for the pipeline, the precision select module updates the precision configuration register to disable a subset of the first plurality of bits of the pipeline.

The precision select module may predict for certain image frames and/or certain segments of a single image frame that the full precision of the hardware pipeline can be reduced when processing the frame or segment. The precision select module updates the precision configuration register according to a number of bits of the hardware compute pipeline to achieve the selected precision. In one embodiment, the precision configuration register is used to gate the clock signal for the bits of the hardware pipeline that are not needed to achieve the selected precision. The precision configuration register can include a number of precision bits corresponding to a subset of the plurality of bits supported by the pipeline. Logic circuitry can combine the clock signal and the outputs of the precision configuration register to either provide the clock signal or gate the clock signal. A first value in a data latch for a precision bit will disable the clock signal for the corresponding bit of the pipeline, and a second value in the data latch will enable the clock signal for the corresponding bit of the pipeline.

FIG. 1 is a block diagram depicting a digital imaging device 100 including a precision select module (PSM) 24 and precision configuration register (PCR) 20 according to one embodiment of the disclosed technology. PCR 20 is also referred to as a control register. Although an example of a hardware pipeline for a digital image processing system is described, it will be appreciated that the described technology may be practiced in any suitable hardware compute architecture. The precision of any type of compute pipeline may be varied in accordance with the disclosed principles. For example, the disclosed technology may be practiced in audio signal processing systems or global or other positioning systems. Moreover, the digital image processing system may be a still image processing system or a video processing system. Thus, images as described herein may include still images and video images in any format.

Digital imaging device 100 includes a lens 10 and an image sensor 12 for capturing an image, and an image signal processor (ISP) 16 for processing the image data supplied from the image sensor 12. The image sensor may a CCD, a CMOS sensor, a super CCD, or any other suitable image sensing device. The image data may be provided in a Bayer format in one example, including an array of Red, Green, and Blue (RGB) color filters arranged on a grid of photosensors, but any type of image data may be used. The image data from the image sensor 12 is supplied to a memory 14 or cache from which the ISP 16 reads the image data for processing. In another arrangement, the image data may be supplied directly to the ISP 16.

A host central processing unit (CPU) 22 controls processing of the image data based upon program data stored in ROM 26, for example. CPU 22 is coupled to RAM 28 for temporary data storage. ISP 16 may perform all of the image processing control of the CPU 22 and/or the CPU 22 may perform part or all of the image processing. The processed image data may be stored in a memory 30 or cache after processing. The processed image data can be provided from memory 30 to a storage medium 32 such as a non-volatile storage medium and/or displayed on display 34 for long term storage. Image data may be stored in any of a number of different formats supported by the digital imaging device 100. Examples of formats that can be used include GIF, JPEG, BMP (Bit Mapped Graphics Format), TIFF, FlashPix, etc.

Image sensor 12 may output an entire image to ISP 16, or it may output each line to the ISP 16 (e.g., using a bucket-brigade manner). For example, the image sensor 12 may be a CCD sensor that operates so that the image data is transferred from the sensor 12 one line at a time and is stored in memory 14. When a line of image data is output from the sensor 12, the line of image data previously stored in memory 14 is shifted out of memory 14 and supplied to ISP 16. In one example, the image data is output in segments of pixel width or is bucket brigaded in pixel width.

The image data may be supplied to memory 14 where it can be stored according to individual lines of the image for example. The image data is supplied from memory 14 to ISP pipeline 18. Image processing then begins on the first image line. Data for the first line is transferred through multiple compute stages in pipeline 18 to complete image processing of the first line. The first line may then be stored in memory 30 and shifted to storage medium 32. Similar processing occurs for each of the remaining image lines. Pipeline processing of lines of the image data increases the processing speed of the imaging device 100, and can reduce the time from obtaining the image at the image sensor 12 to the time when the image data is available for storage by storage medium 32.

Power consumption in digital signal processing for many devices is dependent upon the number of bits processed by a hardware compute pipeline. For example, fixed or floating point hardware pipelines for image signal processing are typically provided with a precision to support the worst case scenario for pixel representation. The pipeline includes data registers and logic gates at each pipeline stage to support the selected precision. These data registers and logic gates consume power as they transition to process image data.

In many cases, the high level precision for the worst case scenario is not needed for most of the pixels that are processed by the pipeline. Nevertheless, the logic gates and registers in the pipeline continue to transition even if the lower order bits represent a level of precision that is not needed for processing. These transitions may consume unnecessary power as calculations propagate through the hardware pipeline. A hardware pipeline may be interchangeably referred to as a hardware compute pipeline, a compute pipeline, or just a pipeline.

Some systems provide different or shared pipelines that support multiple modes at different levels of precision. For example, a first pipeline may be provided with a lower number of bits to support low precision processing and a second pipeline may be provided with a larger number of bits for high precision processing. These systems can examine the data to be processed and select the pipeline with the lowest level of precision that will support the data to be processed. While power consumption may be reduced, the use of multiple pipelines requires significant overhead and limits the ability of power consumption to be fine-tuned.

Other systems attempt to conserve power by turning off portions of the pipeline that are not being used during processing. The systems can examine the data to be processed and the operands to be performed. While power consumption may be reduced in these systems as well, higher levels of precision than required will typically be used as the data is not indicative of the actual level of precision for the application at hand.

In accordance with an embodiment of the disclosed technology, ISP 16 includes a precision configuration register (PCR) 20 that selects the precision of the compute pipeline 18 for processing image data from the image sensor 12. PCR 20 is coupled to the pipeline to reduce the processing precision of the pipeline for blocks of instructions. PCR 20 is configured to disable a clock signal for certain bits in pipeline 18 to thereby prevent the corresponding gates of the pipeline for the disabled bits from toggling as a data segment propagates through the pipeline. In one embodiment, the PCR 20 is used to disable the clock signal and thereby prevent toggling for the data latches in the hardware compute pipeline. In one embodiment, PCR 20 is used to disable the clock signal and thereby prevent toggling of the gates implementing the mathematical logic in the binary lane of the compute pipeline for a corresponding disabled bit. The precision configuration register may also be referred to as a control register.

In one example, PCR 20 stores a value indicating a number of bits to be disabled for the hardware compute pipeline. The number of bits is a number of bits that is to be disabled for the hardware compute pipeline beginning with the least significant bit in the pipeline. In another example, PCR 20 includes a plurality of precision bits where each bit corresponds to a bit from the hardware compute pipeline. A first value for a precision bit will disable the corresponding bit in the hardware compute pipeline and a second value will enable the corresponding bit. The number of precision bits will be less than the number of bits in the compute pipeline and can vary according to the amount of variable precision that is desired in an implementation.

Host CPU 22 is configured with a precision select module (PSM) 24, which can be stored in ROM 26 and used to program CPU 22 to perform the described functionality. PSM 24 is configured to predict or otherwise select a level of precision of pipeline 18 when processing image frames, or image segments within a single image frame. For example, PSM 24 may determine that the maximum level of precision of the pipeline is not needed for some image frames or can otherwise be reduced when processing the image frames.

In FIG. 1, PSM 24 is one type of control circuit or logic for implementing the functionality described herein using host CPU 22. Alternatively, or additionally, the control logic may be implemented as one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In one embodiment, PSM 24 may divide the image data for a single image into segments and select for the individual segments a level of precision for the pipeline 18. In one example, the image segments are defined dynamically by the PSM 24 and a level of precision required to process the dynamically defined image segments is selected. The image segments are pixel ranges in the image data in one embodiment. An image segment may comprise a continuous range of pixels for which the PSM 24 determines a common level of precision should be used by ISP 16 when processing each of the pixels. Consider an image including a person's face for example. The PSM 24 may divide the image into one or more high precision segments that define the pixel ranges corresponding to the face, and one or more low precision segments that define the pixel ranges outside of the face. A person's face may occupy several lines of the image data such that multiple image segments may correspond with the area of the face. For example, a face may be defined by several lines of image data, each containing a segment of pixels that correspond with a portion of the face and one or more portions that do not correspond with the face.

PSM 24 controls PCR 20 during image processing to select the appropriate precision for pipeline 18. Prior to processing an image frame or segment, PSM 24 sets PCR 20 to select the previously determined precision for processing the segment. For example, PSM 24 can monitor processing by ISP 16 to determine whether the currently selected precision of PCR 20 matches the level of precision predicted for an upcoming range of pixels to be processed by ISP 16. If the level of precision does not match, PSM 24 updates PCR 20 prior to processing the range of pixels. In this manner, PSM 24 can monitor processing and update the PCR when a change in the level of precision can or should be made to process one or more pixels of the image data.

PCR 20 is coupled to clock 19 of the hardware compute pipeline 18. Clock 19 provides a clock signal to each of the data registers at each stage within the hardware compute pipeline. The clock signal is coupled to the plurality of data latches for each of the bits of the pipeline at each stage. In one embodiment, the clock signal is coupled to a subset of the plurality of bits of the pipeline through a plurality of gates. Each gate includes a first input that receives the clock signal and a second input that receives an output of the precision control register. The gate for each of the subset of bits combines the clock signal with the output of the precision control register to generate an output. In this manner, the output of the precision control register can be used to gate or otherwise disable the clock signal for selected bits in the pipeline. By disabling the clock signal for a bit in the pipeline, the data latches in the pipeline for the corresponding bit will not toggle or otherwise change state in response to the clock. In this manner, the precision of the hardware compute pipeline is reduced in response to the precision control register. By preventing toggling of selected data latches in the pipeline, the power consumed by the pipeline when processing an image segment can be reduced.

Figure 2:
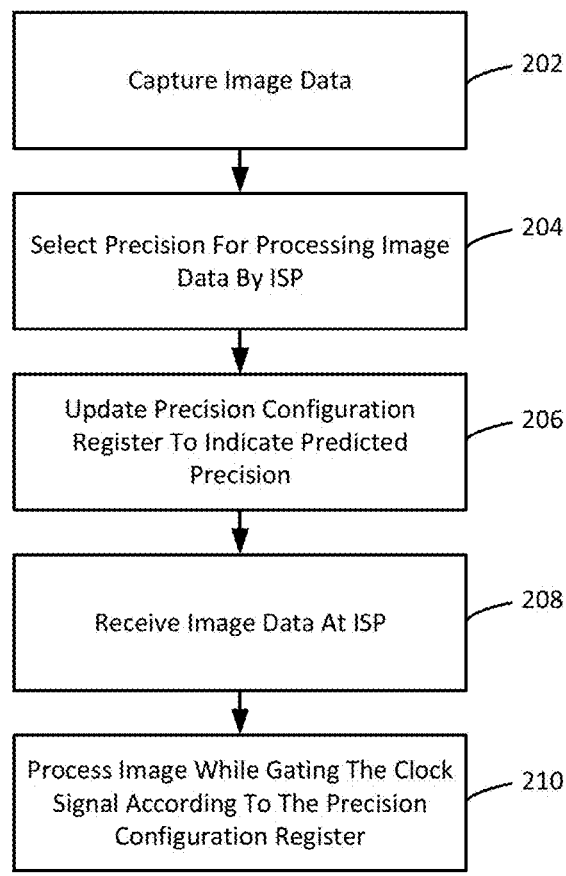
FIG. 2 is a flowchart describing a process of variable precision processing for data frames in a hardware compute pipeline.

FIG. 2 is a flowchart describing a method of processing a digital image according to one embodiment of the disclosed technology. At step 202, image data is captured at a digital imaging device. For example, raw image data may be generated by an image sensor 12 and captured in memory 14 for processing by image signal processor (ISP) 16. In another example, the raw image data may be transferred directly to ISP 16 from the image sensor.

At step 204, the precision select module selects a level of precision that can be used to process the image data in the pipeline 18. Notably, the precision select module can select a level of precision by predicting a level of precision that is needed to process the image data by the ISP pipeline. The PSM applies system-level information about the image to determine a level of pipeline precision that should be used to process the image data. Numerous techniques and algorithms may be applied to predict a level of precision that will be needed to process image data by the pipeline.

The PSM selects the precision of the pipeline for processing the image data without accessing or processing the segment by the PSM or the ISP. Instead, the PSM is configured to select the level of precision based on higher system-level information pertaining to the image data. For example, the system may determine a mode of the digital imaging device. The device may be set to a first mode where the PSM selects a first level of precision for the ISP to use in processing the image data and a second mode where a second level of precision that is higher than the first level of precision is used. Additional modes with variable precisions may be used.

In one example, the PSM may select a precision based on a filter that is to be applied to the raw image data. Filters may be used to alter image data to apply enhancements, modifications, effects, etc. to an image. The application of different filters may entail different levels of precision in processing the image data. Some filters may affect the image data at a detailed level requiring the incorporation of the least significant bits in the image data while others may affect the image data at a system level that only requires the first few most significant bits of the image data for a pixel. In this manner, the PSM may select or predict a level of precision for processing the image data based on a filter that is to be applied to the image data.

In one example, the PSM may select a level of precision for processing the image data based on an image previously processed by the ISP 16. For example, the image data may be for one image in a sequence of video images. The PSM may select the level of precision based on the image data for a previously processed image. If the PSM determines that the previous image contained low levels of detail for example, the PSM can reduce the level of precision of the pipeline from its maximum capability. The image being captured may also follow directly another still image that is captured by the device in rendering an image for the user of the device to view before capturing a final image. The image being captured may also be part of a burst of photos depicting the same or a similar scene. The PSM may use any type of data without accessing the actual image data in order to select a level of precision for processing the selected image data by the ISP The PSM 24 updates the configuration register at step 206 to indicate the selected level of precision. The PSM 24 may update the precision configuration register to indicate the bits or data latches in the hardware pipeline for which the clock signal should be gated. The PSM 24 may write to the configuration register to set the precision bits to disable the clock signal for corresponding data latches in the hardware pipeline. In another example, the PSM 24 can write a value to a precision control register to indicate a number of data latches for which the clock signal should be gated. The value indicates the number of bits of the pipeline to be disabled to reduce the effective precision of the pipeline.

At step 208, the image is received at ISP 16 after selecting and setting the precision control register at step 206. At step 210, the ISP pipeline processes the image while gating the clock signal for selected bit positions according to the precision configuration register. Individual precision bits in the precision control register can be combined with the clock signal by a gate as earlier described. For the less significant bits in the pipeline not needed for the selected precision, the clock signal is disabled by the gate according to the precision configuration register.

Figure 3:
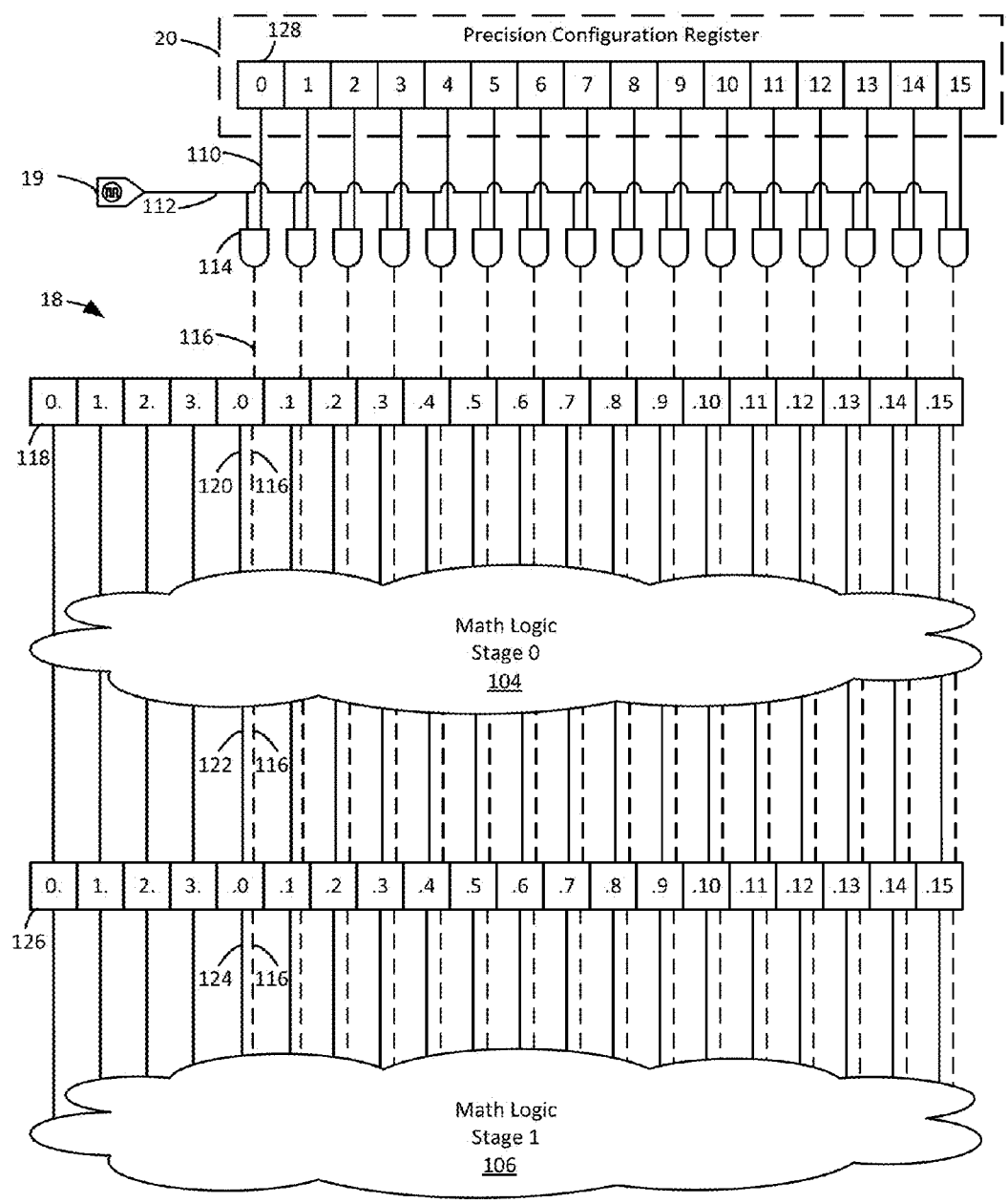
FIG. 3 is a block diagram depicting a hardware compute pipeline.

FIG. 3 is a block diagram depicting a portion of an image signal processor 16 according to one embodiment of the disclosed technology. ISP 16 includes a clock 19, hardware compute pipeline 18, and a precision control register 20 for setting the precision of the hardware compute pipeline by selectively gating the clock using a set of gates 114.

FIG. 3 depicts a simple example of a hardware compute pipeline 18 that includes two pipeline stages. Two pipeline stages are depicted by way of example as a compute pipeline can include any number of compute stages suitable for the desired processing. Each pipeline stage includes a data register to be used in the pipeline stage. Each data register includes data latches to store a value for one of a plurality of bits corresponding to the level of mathematical precision of the compute pipeline. The first pipeline stage includes a set of data latches 118 for storing 20 bits of data and math logic 104 to perform an operation on the data. The outputs 120 from the first set of data latches are provided to the math logic 104 for the first pipeline stage. The math logic 104 utilizes the data latch values in the first pipeline stage and passes the results as outputs 122 to the second pipeline stage. The second pipeline stage includes a set of data latches 126 that store the results of the first pipeline stage. The values form the second set of data latches are provided as outputs 124 to the math logic 106 at the second stage. A final set of output data latches (not shown) may be coupled to the math logic 106 to store the final values for each bit position in the pipeline.

The number of data latches at each stage is equal to the number of bits for the maximum mathematical precision of the compute pipeline. FIG. 2 depicts an example of a fixed point mathematical precision of 4.16 that utilizes twenty data latches to store one bit from each position. Four latches are used to store the bit positions to the left of the decimal point and 16 latches are used to store the bit positions to the right of the decimal point. Bit '0.' is the most significant bit (MSB) and bit '.15' is the least significant bit (LSB). It is noted that the any type of mathematical representation including floating point representations may be used in accordance with embodiments of the disclosure.

Precision control register 20 includes a set of latches 128 that have a correspondence to a subset of the data latches in each of the pipeline stages. In this particular example, PCR 20 includes sixteen data latches storing precision bits that correspond to the sixteen bits to the right of the decimal point in the data latches at the pipeline stages. It is noted that the use of sixteen data latches for the precision control register is included by way of example only. In other examples, more or fewer than sixteen latches may be used to provide a desired level of variability in precision for the pipeline. Latch 0 of PCR 20 corresponds to latch '.0' in the pipeline stages, latch 1 corresponds to latch '.1' in the pipeline stages, latch 2 corresponds to latch '.2' in the pipeline stages, etc.

The set of gates 114 are coupled between the clock 19 and the set of data latches 118 at the first compute stage to selectively disable the clock signal 112 based on the precision control register 20. Each gate 214 includes a first input that is coupled to the clock signal 112 and a second input that is coupled to the output of a corresponding latch in the precision configuration register. In FIG. 3, an example is provided where gates 114 are logic AND gates but other types of logic may be used. The output signal 116 from each gate 214 is coupled to the corresponding data latch in the sets of data latches at the different pipeline stages. For example, the clock output signal 116 of gate 114 for the first PCR latch '0' is coupled to the clock input of for data latch '.0' in the first set of data latches 218 and the second set of data latches 126. The clock output signals 116 of the gates for each latch in the precision control register are shown with a dotted line in FIG. 2.

The precision select module may set values in the precision configuration register to select the precision of the pipeline 18 for a block of instructions. By way of example, a bit in PCR 20 may be set to '1' to enable a corresponding bit in the pipeline and may be set to '0' to disable a corresponding bit in the pipeline. A bit value of '1' can be combined with a clock value of '1' by the AND gate to pass the clock signal value on output 116 to the pipeline. Conversely, a bit value of '0' in the PCR will result in an output 116 equal to '0' regardless of the clock value. In this manner, setting the data latch to '0' for a bit position in the PCR 20 will disable or gate the clock signal from being applied to the set of data latches in the different pipeline stages. The sets of data latches 118 and 126 are updated as processing by the pipeline progresses. The clock signal is gated from application to the data latches such that the data latches will maintain their previous value and not be updated.

For example, the image data for a pixel may be provided to the image signal processor and initially used to update the values in the set of data latches 118 at the first pipeline stage.

When the clock signal goes high, the image data is captured in the set of data latches. By setting a data latch in the precision control register to '0', the clock signal is gated by gate 114 so that the image data will not be captured for a corresponding bit. Similarly, the output of math logic 104 from the first compute stage will be captured in the second set of data latches 126 when the clock signal goes high. When a latch in precision control register is set to '0', the output of math logic 104 is not captured in the corresponding data latch 226 and its previous value is maintained.

The clock signal can be gated or disabled beginning with the least significant bit, bit '.15', and continue for a desired number of bits in the direction of the most significant bit, bit '0.' By disabling the clock signal from the LSB toward the MSB, the overall precision of the pipeline can be reduced by turning off the data latches for some of the less significant bits. The number of disabled data latches will control the level of precision of the pipeline for a block of instructions. In this manner, a full precision of 4.16 can be used when needed, and a lower level of precision such as 4.4 or 4.8 may be used when processing is less critical.

In FIG. 3, an example is described where the precision configuration register 20 includes a set of latches having a direct correspondence with a subset of the data latches at each stage of the pipeline. The value of one bit in the control register directly controls application of the clock signal to a corresponding bit in the data register. In another example, the precision configuration register may store a value indicating a number of the data latches in each pipeline stage to be disabled. The value in the precision configuration register is used to disable the clock signal, beginning with the least significant bit in the pipeline and proceeding contiguously toward the most significant bit for the indicated number.

Figure 4:
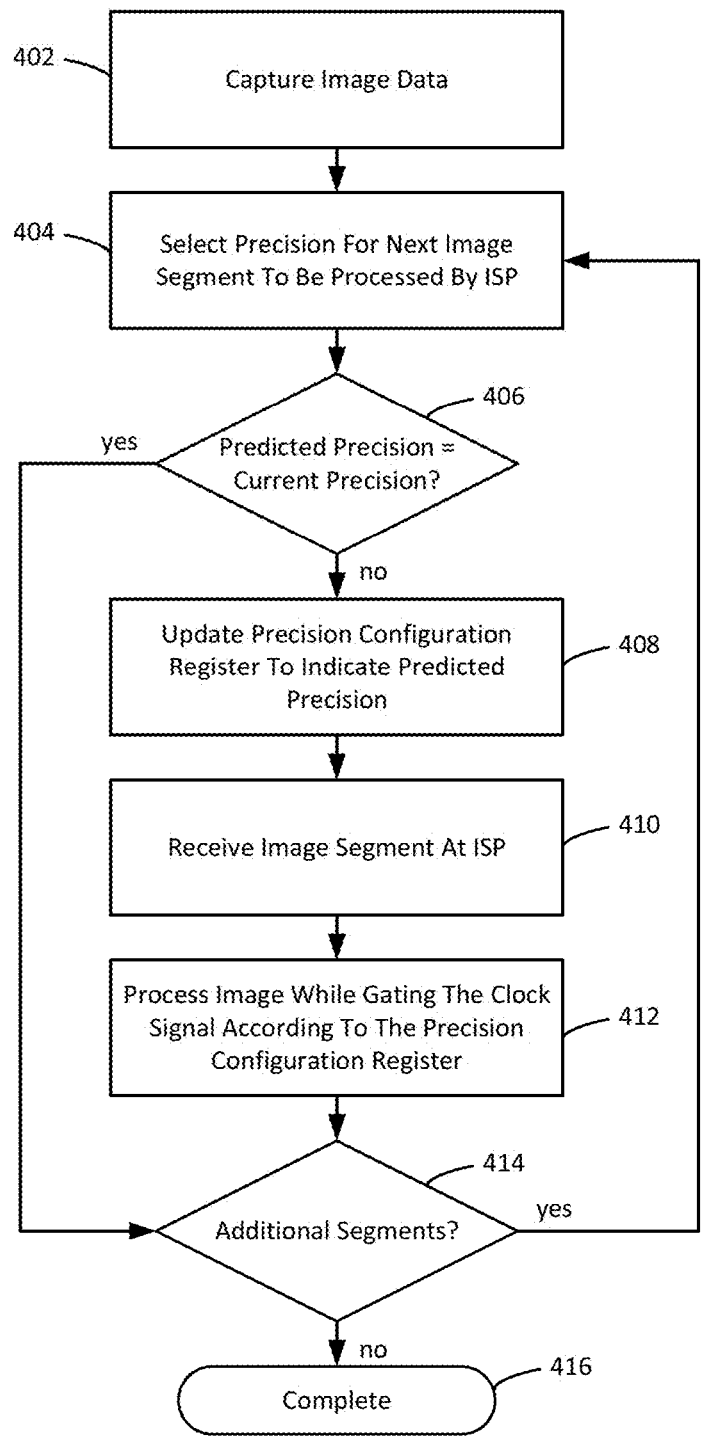
FIG. 4 is a flowchart describing a process of variable processing for segments of a data frame in a hardware compute pipeline.

FIG. 4 is a flowchart describing a method of processing a digital image according to one embodiment of the disclosed technology. At step 402, image data is captured at a digital imaging device. For example, raw image data from image sensor 12 may be captured in memory 14, or may be captured directly by image signal processor (ISP) 16.

At step 404, the precision select module predicts for a first segment of the image data a level of precision that should be used to process the first segment in the pipeline 18. Notably, the precision select module predicts the level of precision for each segment without accessing or processing the segment by the PSM or the ISP. Instead, the PSM is configured to select the level of precision for each segment based on higher system-level information pertaining to the image data. The PSM may predict for each segment whether the full precision of the pipeline is needed or whether a reduced precision can be used, without accessing or observing the image data. In general, the PSM predicts for each segment a level of precision based on an identified importance or amount of image manipulation or processing that is required or otherwise should be used.

In one example, PSM 24 dynamically generates segments at step 404. For example, the PSM 24 may determine a contiguous range of pixels for which the level of precision of the pipeline should be the same. PSM 24 can group the range of pixels together for processing at the same level of precision through the pipeline. The PSM 24 may dynamically generate the segments for the entire image data at once or may dynamically generate the segments as portions of the image data are received from the image sensor. In another example, PSM 24 utilizes predetermined segments and segment sizes. For example, PSM 24 may assign a level of precision to a range of pixels corresponding to each line of image data as received from the image sensor.

In one example, the PSM predicts a level of precision needed for segments of a second image frame based on a first image frame captured prior to the second image frame. For example, a low resolution image may be captured by a digital imaging device before receiving input from a user to capture and process a final image frame at the imaging device. The PSM may access the image data for the first frame to select a mathematical precision for processing image data for the second frame. For example, the PSM may identify in the first image frame an area corresponding to a person's face or otherwise of more complexity in processing or of interest. At step 404, the PSM may predict the level of precision for the segment of the second frame by determining whether it corresponds to the area in the first image frame containing the face or other area of complexity. If the segment in the second frame corresponds to the area in the first frame, a high level of precision is selected at step 404. If the segment in the second frame is outside of the area in the first frame, a low level of precision is selected at step 404. Step 404 may take many forms and utilize any number of levels of precision. In one simple example, a simple determination of a highest level of precision corresponding to the full precision of the pipeline or a single established lower level of precision may be selected. In other examples, additional levels of precision can be established.

In another example, the level of precision can be selected for the image segment based on a predicted interest of the user in viewing a corresponding area of the image. For example, the PSM may select a high level of precision for the pipeline when the segment of the image data corresponds to an area of the image likely to be of interest to a user viewing the image, while the PSM may select a low level of precision for the pipeline when the segment is determined likely not to be of interest to the user. For example, an image depicting a salient object may be processed. The system may determine that the area of the image depicting the object may be of more interest to the user than an area depicting a background, for example. Accordingly, the system may select a high level of precision when processing one or more segment of the image depicting the object and a lower level of precision when processing one or more segments depicting a background region.

In one specific example, eye gaze data from a user of a head-mounted display (HMD) may be used to determine areas of interest in an image based on whether a user is actively looking at the area. Image data from a first image sensor can be used to determine eye gaze information which is used to determine the level of precision to use in the hardware compute platform when processing image data from a second image sensor. The first image data is from a first image sensor and is of the user. The second image data is from a second image sensor and is of a different scene than the first image data. The first image data may be used to determine an area of focus of the user. The area of focus may also be selected by the user directly. The system may determine that segments of the second image corresponding to the area of focus of the user should be processed with a higher level of the precision than areas not corresponding to the user's focus.

At step 406, PSM 24 determines whether the selected precision for the next segment to be processed by the ISP 16 is equal to the current precision of the pipeline as set in the precision control register. If the selected precision for the next segment matches the current precision, the process proceeds at step 414 to determine if there are additional segments of the image data to be defined or for which a level of precision should be selected. If additional segments remain, the process returns to step 404 to select a level of precision for the next segment to be processed by the ISP. If additional segments do not remain, the process completes at step 416.

If the current precision of the pipeline does not match the selected precision for the segment, the PSM 24 updates the configuration register at step 408 to indicate the selected level of precision. In one example, the PSM may wait until processing for any previous segments completes or nears completion by the ISP. The PSM will update the configuration register prior to processing beginning for the selected segment.

At step 410, the image segment is received at ISP 16 after selecting and setting the precision control register to the precision selected for the image segment at step 404. At step 412, the ISP pipeline processes the image segment while gating the clock signal for selected bit positions according to the precision configuration register. Individual precision bits in the precision control register can be combined with the clock signal by a gate as earlier described. For the less significant bits in the pipeline not needed for the selected precision, the clock signal is disabled by the gate according to the precision configuration register.

At step 414, the PSM 24 determines whether there are remaining segments of the image data for which a precision level is to be predicted. If the PSM has evaluated each of the image segments of the image data, the process completes at step 416. If additional segments remain to be evaluated for a precision level, the process continues at step 404.

It is noted that steps 408-412 may continue after selecting the precision level for each of the segments. For example, the PSM may dynamically select the segments of the image data and select a precision level for each of the segments. The PSM may then update the configuration register at step 408 just before processing begins for each of the segment. In this manner, PSM 24 may provide a prediction as the image segments are received from the image sensor at the ISP for processing or may provide a prediction for all the image data before the image segments are provided to the ISP.

Figure 5:
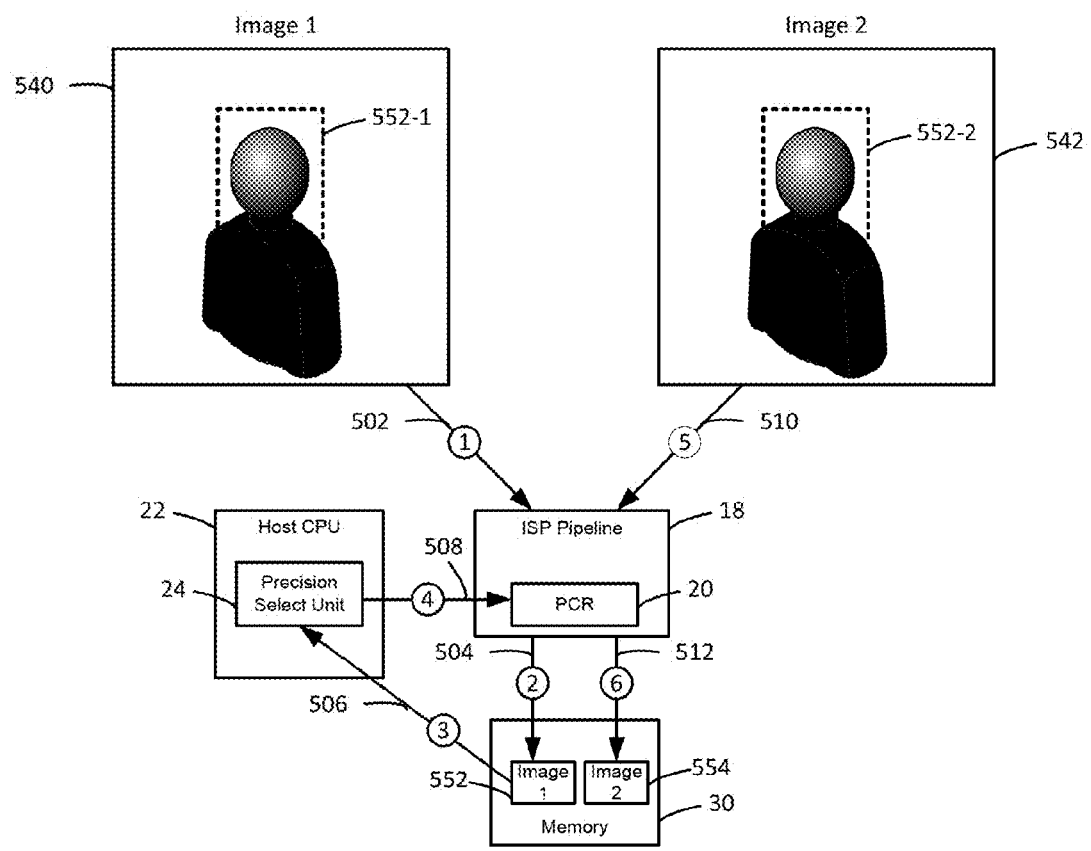
FIG. 5 is a block diagram depicting image processing for a first and second image frame.

FIG. 5 is a high level block diagram describing one example of defining segments for an image and selecting a level of precision of the compute pipeline for processing each of the segments. In this example, a first digital image frame is used to select the precision of the hardware compute pipeline when processing a second digital image frame having a visual correspondence with the first image. At 502, image data for a first image is captured by an image sensor and received at the ISP pipeline. The first image may be a low-resolution image captured prior to a final high-resolution image that is subsequently captured according to user input, however, the first image may be any image having a correspondence to a second image that is captured subsequent to the first image. The ISP pipeline processes the image data, for example according to pixels in a sequential manner. At 504, the image data 552 for the first image is stored in memory 30.

At 506, the PSM 24 accesses all or a portion of the image data 552 in preparation for processing image data from a second image 542. PSM 24 determines an area 552-1 in the first image that corresponds with a facial region in the first image. For example, the ISP 16 may process the first image and use facial recognition to identify area 552-1 in the first image. After identifying region 552-1, PSM 24 dynamically identifies different segments of the image data for the second image. For example, the PSM 24 may generate one or more first segments corresponding to the area outside of the boxed area 552-2 in the second image and one or more second segments corresponding to the region within the boxed area 552-2. The segments may be sets of contiguous pixels or pixel ranges that can be processed with the same level of precision.

At 508, the PSM updates the PCR at the ISP to identify the selected level of precision for processing the second image 542. At 510, the second image data is received at the ISP pipeline and is processed according to the selected precision by the PSM. If the PCR indicates that processing is to be performed at less than the full precision of the pipeline, the PCR is used to gate the clock signal for lower precision bits when processing the image data. It is noted that the PSM may update the PCR many times during processing of the second image. For example, the second image may be processed according to lines of the image data received from the image sensor. The precision select module may update the PCR prior to processing the individual segments to provide the selected precision for processing. For example, the PSM may set the PCR to a low precision level for processing the pixels beginning with a first pixel until reaching the area corresponding to boxed area 552-2. The PSM may set the PCT to increase the precision for processing a portion of the first line within boxed area 552-2, then update the PCR to lower the precision when processing those pixels outside of the boxed area 552-2. This process is repeated as the ISP processes the ranges of pixels to complete processing of the image. At 512, the processed image data 554 is stored at memory 30.

Figure 6:
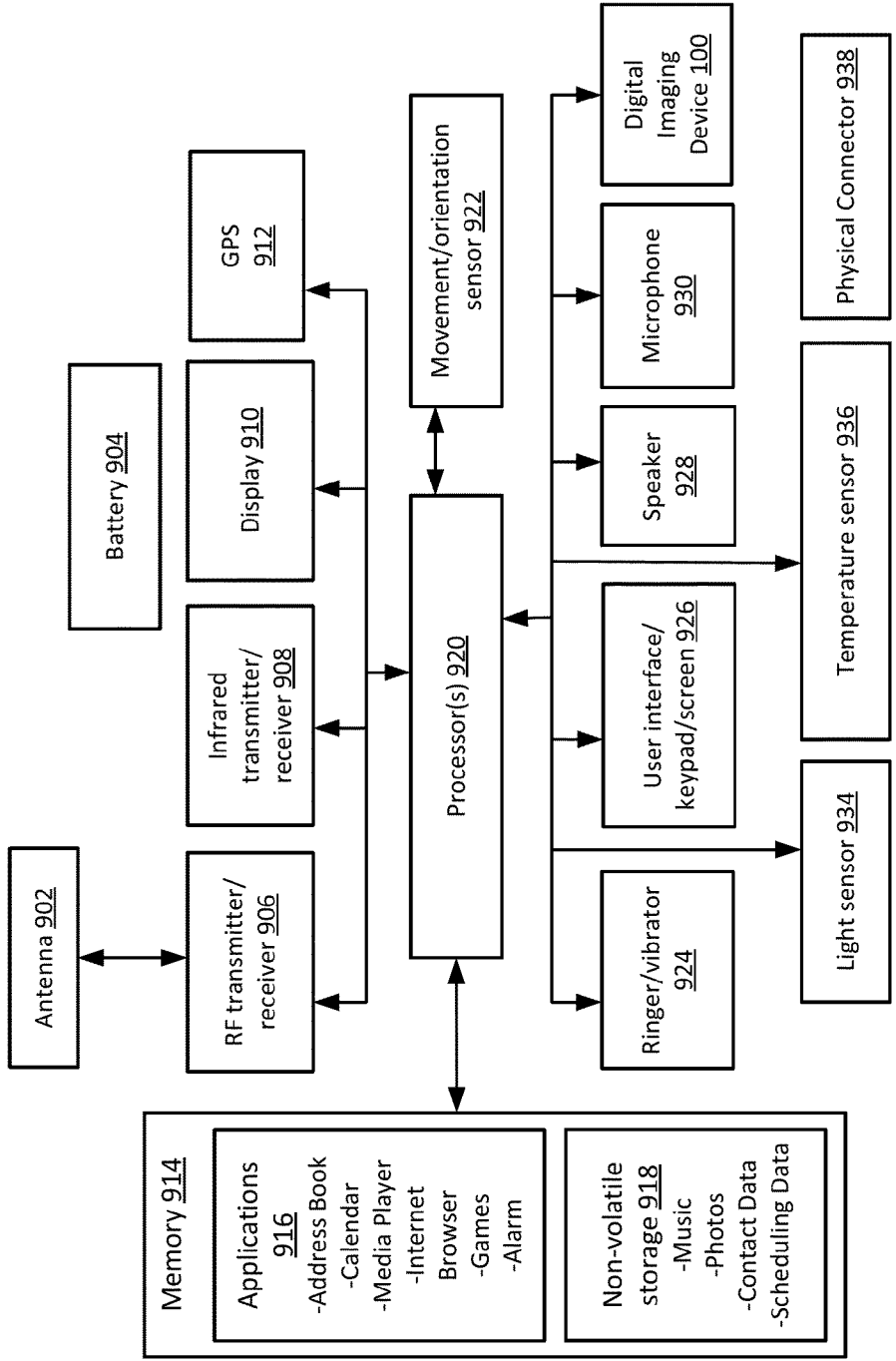
FIG. 6 is a block diagram depicting a mobile computing device.

FIG. 6 is a block diagram of one embodiment of a mobile device 900 including a digital image device 100 as described in FIG. 1. Mobile devices may include laptop computers, pocket computers, mobile phones, head-mounted displays (HMDs), personal digital assistants, and handheld media devices that have been integrated with wireless receiver/transmitter technology. The mobile device of FIG. 6 is presented by way of example as one illustrative implementation of the disclosed technology. It will be appreciated that a digital image device 100 according to embodiments of the disclosure may be incorporated into many other processor-based devices, including non-mobile devices.

Mobile device 900 includes one or more processors 920 and memory 914. Memory 914 includes applications 916 and non-volatile storage 918. Memory 914 can be any variety of memory storage media types, including non-volatile and volatile memory. For example, memory 914 may include random access memory (RAM), dynamic RAM (DRAM), synchronous DRAM (SDRAM), static RAM (SRAM), or other types of storage devices. A mobile device operating system handles the different operations of the mobile device 900 and may contain user interfaces for operations, such as placing and receiving phone calls, text messaging, checking voicemail, and the like. The applications 916 can be any assortment of programs, such as a camera application for photos and/or videos, an address book, a calendar application, a media player, an internet browser, games, an alarm application, and other applications. The non-volatile storage component 918 in memory 914 may contain data such as music, photos, contact data, scheduling data, and other files.

The one or more processors 920 are in communication with a display 910. The display may be a traditional display, a touchscreen display, or a see-through display that displays one or more virtual objects associated with a real-world environment. The one or more processors 920 also communicate with RF transmitter/receiver 906 which in turn is coupled to an antenna 902, with infrared transmitter/receiver 908, with global positioning service (GPS) receiver 912, and with movement/orientation sensor 922 which may include an accelerometer and/or magnetometer. RF transmitter/receiver 906 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 920 further communicate with a ringer/vibrator 924, a user interface keypad/screen 926, a speaker 928, a microphone 930, a digital image device 100, a light sensor 934, and a temperature sensor 936. The user interface keypad/screen may include a touch-sensitive screen display.

The one or more processors 920 controls transmission and reception of wireless signals. During a transmission mode, the one or more processors 920 provide voice signals from microphone 930, or other data signals, to the RF transmitter/receiver 906. The transmitter/receiver 906 transmits the signals through the antenna 902. The ringer/vibrator 924 is used to signal an incoming call, text message, calendar reminder, alarm clock reminder, or other notification to the user. During a receiving mode, the RF transmitter/receiver 906 receives a voice signal or data signal from a remote station through the antenna 902. A received voice signal is provided to the speaker 928 while other received data signals are processed appropriately.

Additionally, a physical connector 938 may be used to connect the mobile device 900 to an external power source, such as an AC adapter or powered docking station, in order to recharge battery 904. The physical connector 938 may also be used as a data connection to an external computing device. The data connection allows for operations such as synchronizing mobile device data with the computing data on another device.

Digital image device 100 includes a precision select module 24 and precision control register 20 as described with respect to FIG. 1. Host CPU 22 may include the one or more processors 920 or a dedicated processor formed as part of the digital imaging device 100. Similarly, memory 14, memory 30, ROM 26, RAM 28, and storage medium 32 may be implemented using memory 914 and non-volatile storage 918 or standalone memories incorporated in the digital imaging device.

The disclosed technology is operational with numerous general purpose or special purpose computing system environments or configurations. Examples of well-known computing systems, environments, and/or configurations that may be suitable for use with the technology include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules or units, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

One or more embodiments of the present disclosure may include a variety of computer readable media. Computer readable media can be any available media that can be accessed by a computing device and includes both volatile and nonvolatile media, removable and non-removable media. By way of example, and not limitation, computer readable media may comprise computer readable storage media and communication media. Computer readable storage media includes volatile and nonvolatile, as well as removable and non-removable media implemented in any method or technology for storage of information such as computer readable instructions, data structures, program modules or other data. Computer readable storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the information and which can be accessed by a computing device. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

Accordingly, a digital signal processing system is disclosed that includes a hardware pipeline including a clock signal and a set of data latches for storing a first plurality of bits in a first pipeline stage, a control register configured to select a precision of the hardware pipeline, and control logic configured to determine for a plurality data frames whether a full precision of the hardware pipeline can be reduced when processing each data frame. The control logic is configured to set the control register to select a reduced precision of the hardware pipeline in response to a determination that the full precision of the hardware pipeline can be reduced for one or more of the data frames. The system includes one or more gates configured to disable the clock signal for one or more of the data latches of the hardware pipeline based on the control register when processing the one or more data frames.

A method of digital signal processing is disclosed that includes predicting for one or more segments of a data frame that a full precision of a hardware pipeline can be reduced when processing the one or more segments. The hardware pipeline includes a set of data latches for storing a plurality of bits in a first pipeline stage of the hardware pipeline and a clock signal coupled to each of the data latches. The method includes setting a precision configuration register based on predicting that the full precision of the hardware pipeline can be reduced for processing the one or more segments, and in response to the precision configuration register, disabling the clock signal for one or more of the data latches in the first pipeline stage during processing of the one or more segments of the data frame.

A digital signal processing system is disclosed that includes a hardware pipeline including a clock signal and a set of data latches for storing a first plurality of bits in a first pipeline stage, a control register configured to select a precision of the hardware pipeline, and a processor configured to predict for a plurality of segments of a data frame whether a full precision of the hardware pipeline is needed when processing each segment of the data frame. The processor is configured to set the precision control register to select a reduced precision of the hardware pipeline in response to determining that the full precision of the hardware pipeline is not needed for one or more segments of the data frame. The system includes logic circuitry configured to disable the clock signal for one or more of the data latches of the hardware pipeline based on the control register when processing the one or more segments of the data frame.

An apparatus is disclosed that includes one or more hardware compute stages that support a maximum precision. The apparatus includes one or more control circuits in communication with the one or more hardware compute stages. The one or more control circuits are configured to predict for a plurality of segments of a data frame a level of precision of the one or more compute stages that is needed to process each segment. The one or more control circuits are configured to disable at least a portion of the one or more hardware compute stages for a selected segment of the data frame when a predicted level of precision for the one or more hardware compute stages is less than the maximum precision of the one or more hardware compute stages Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A digital signal processing system, comprising:
   a hardware pipeline including a clock signal and a set of data latches for storing a first plurality of bits in a first pipeline stage;
   a control register configured to select a precision of the hardware pipeline;
   control logic configured to determine for a data frame that a first precision of the hardware pipeline can be used when processing a first segment of the data frame and a second precision that is lower than the first precision can be used when processing a second segment of the data frame, the control logic is configured to set the control register to select the first precision of the hardware pipeline for the first segment and the second precision for the second segment; and
   one or more gates configured to disable the clock signal for a first number of the data latches of the hardware pipeline based on the control register when processing the first segment and a second number of data latches when processing the second segment, the first number is less than the second number.

2. The digital signal processing system of claim 1, wherein:
   the control register includes a plurality of precision bits corresponding to a subset of the first plurality of bits in the first pipeline stage; and
   the one or more gates are configured to disable the clock signal for the first number of data latches of the hardware pipeline based on one or more of the precision bits corresponding to the first number of data latches.

3. The digital signal processing system of claim 1, wherein:
   the control register is configured to store a value indicating a number of the first plurality of bits for which the clock signal is to be disabled; and
   the number of the first plurality of bits is a number of bits beginning with a least significant bit to be disabled.

4. The digital signal processing system of claim 1, wherein:
   the control logic is configured to predict for the plurality of data frames whether the full precision can be reduced without accessing the plurality of data frames.

5. The digital signal processing system of claim 1, wherein:
   the set of data latches is a first set of data latches;
   the hardware pipeline includes one or more additional sets of data latches for storing the first plurality of bits in each of one or more additional pipeline stages of the hardware pipeline; and
   the one or more gates are configured to disable the clock signal for a first number of the data latches in the one or more additional sets of data latches for the one or more additional pipeline stages during processing of the first segment.

6. The digital signal processing system of claim 1, wherein:
   the one or more data frames include a first data frame and a second data frame;
   the hardware pipeline is configured to process the first data frame prior to the control logic predicting for the second data frame whether the full precision of the hardware pipeline can be reduced; and
   the control logic is configured to predict that a full precision of the hardware pipeline can be reduced for the second data frame based on a correspondence between the first data frame and the second data frame.

7. A method of digital signal processing, comprising:
   determining for a data frame that a first precision of a hardware pipeline can be used when processing a first segment of the data frame and a second precision that is lower than the first precision can be used when processing a second segment of the data frame, the hardware pipeline includes a set of data latches for storing a plurality of bits in a first pipeline stage of the hardware pipeline and a clock signal coupled to each of the data latches;
   setting a precision configuration register to indicate the first precision for processing the first segment and the second precision for processing the second segment; and
   in response to the precision configuration register, disabling the clock signal for a first number of the data latches in the first pipeline stage during processing of the first segment and a second number of the data latches during processing of the second segment of the data frame, wherein the first number is less than the second number.

8. The method of claim 7, wherein:
   said determining that the first precision and the second precision of the hardware pipeline can be used is performed without accessing the data frame; and
   said determining that the first precision and the second precision of the hardware pipeline can be used is performed by a precision select module of a processor coupled to the hardware pipeline.

9. The method of claim 7, wherein:
said setting the precision configuration register includes setting a first value in the precision configuration register prior to processing the first segment by the hardware pipeline and setting a second value in the precision configuration register prior to processing the second segment.

10. The method of claim 7, wherein:
the set of data latches is a first set of data latches;
the hardware pipeline includes a second set of data latches for storing the plurality of bits in a second pipeline stage of the hardware pipeline;
the clock signal is coupled to each of the data latches of the second set of data latches; and
said method further comprises disabling the clock signal for a first number of the data latches in the second set of data latches for the second pipeline stage during processing of the first segment and a second number of the data latches in the second set of data latches for the second pipeline stage during processing of the second segment.

11. The method of claim 7, wherein the data frame is a second digital image frame, the method further comprising:
processing a first digital image frame prior to said determining for the second digital frame that the first precision and the second precision can be used; and
based on said processing the first digital image frame, determining that the first precision can be used for a first segment of the first digital image frame and a second precision can be used for a second segment of the first digital image frame; and
wherein said determining for the second digital image frame that the first precision can be used for the first segment and the second precision can be used for the second segment is based on a correspondence between the first segment of the first digital image frame and the first segment of the second digital image frame and a correspondence between the second segment of the first digital image frame and the second segment of the second digital image frame.

12. The method of claim 7, wherein:
the precision configuration register includes a plurality of precision bits corresponding to a subset of the set of data latches; and
said disabling the clock signal includes disabling the clock signal for the first number of data latches of the hardware pipeline based on one or more of the precision bits corresponding to the first number of data latches.

13. An apparatus, comprising:
one or more hardware compute stages supporting a maximum precision;
one or more control circuits in communication with the one or more hardware compute stages, the one or more control circuits are configured to predict for one or more segments of a second data frame that a level of precision of the one or more compute stages can be reduced when processing the one or more segments based on a correspondence with one or more segments of a previously processed first data frame, the one or more control circuits are configured to disable at least a portion of the one or more hardware compute stages when processing the one or more segments of the second data frame to reduce the maximum precision of the one or more hardware compute stages.

14. The apparatus of claim 13, wherein:
each hardware compute stage includes a data register that supports the maximum precision; and
the one or more control circuits are configured to gate a clock signal for the at least a portion of the one or more hardware compute stages for a selected segment when the predicted level of precision is less than the maximum precision.

15. The apparatus of claim 14, wherein:
the data register for each hardware compute stage is configured to store a plurality of bits for the maximum precision; and
the one or more control circuits are configured to gate the clock signal for a subset of the plurality of bits at each hardware compute stage based on the predicted level of precision for the selected segment.

16. The apparatus of claim 15, wherein:
the one or more control circuits include a control register that is configured to store a value indicating the subset of the plurality of bits for which the clock signal is to be disabled; and
the subset of the plurality of bits includes a continuous range of bits beginning with a least significant bit to be disabled.

17. The apparatus of claim 13, wherein:
the one or more control circuits include a processor that is configured to predict for the plurality of segments of the second data frame the level of precision based on a level of interest of a user corresponding to each segment of the second data frame.

18. The apparatus of claim 13, wherein:
the second data frame includes an image depicting an object and one or more background regions; and
the one or more control circuits are configured to select a higher level of precision for the one or more hardware compute stages when processing one or more segments of the image depicting the object than when processing one or more segments of the image depicting the one or more background regions.

19. The apparatus of claim 13, wherein:
the second data frame includes an image; and
the one or more control circuits are configured to determine an area of focus of a user viewing the image; and
the one or more control circuits are configured to select a higher level of precision for the one or more hardware compute stages when processing one or more segments of the image corresponding to the area of focus of the user than when processing one or more segments of the image corresponding to an area not of focus.

20. The apparatus of claim 13, wherein:
the second data frame is a second digital image frame and the first data frame is a first digital image frame; and
the one or more control circuits are configured to determine that the one or more segments of the first digital image frame are suitable for lower precision processing by the hardware pipeline.

* * * * *